United States Patent [19]

Usami et al.

[11] Patent Number: 4,802,894
[45] Date of Patent: Feb. 7, 1989

[54] METHOD OF USING A STRUCTURAL MEMBER OF ANTI-SULFUR-ATTACK CR-NI-AL-SI ALLOY STEEL FOR COAL GASIFICATION SYSTEM

[75] Inventors: Kenichi Usami; Seishin Kirihara, both of Hitachi; Tadaoki Morimoto, Ibaraki; Hiroyuki Doi; Michiya Okada, both of Hitachi, all of Japan

[73] Assignee: Hitachi, Ltd., Tokyo, Japan

[21] Appl. No.: 2,285

[22] Filed: Jan. 12, 1987

Related U.S. Application Data

[63] Continuation of Ser. No. 795,777, Nov. 7, 1985, abandoned.

[30] Foreign Application Priority Data

Nov. 9, 1984 [JP] Japan .................... 59-234981

[51] Int. Cl.[4] .................... C10J 3/76
[52] U.S. Cl. .................... 48/77; 48/210; 48/67; 148/327; 148/909; 420/50; 420/52
[58] Field of Search .................... 420/43, 50, 51, 52, 420/53, 78, 103, ; 148/327, 909; 201/267.1, 18; 48/77, 210, 67

[56] References Cited

U.S. PATENT DOCUMENTS 1,538,360  2/1919  Smith .................... 420/51
4,108,641  8/1978  Fujioka et al. .................... 420/51

FOREIGN PATENT DOCUMENTS 3300392  7/1983  Fed. Rep. of Germany ...... 148/327
2181891  12/1973  France .
5647552  4/1981  Japan .................... 420/51
2073249  10/1981  United Kingdom .

Primary Examiner—Deborah Yee
Attorney, Agent, or Firm—Antonelli, Terry & Wands

[57] ABSTRACT

A structural member to be subjected to a hot gas atmosphere produced through reaction between coal and a gasifier such as oxygen, air, steam or hydrogen, in a gasification furnace for example. The structural member is made of an anti-sulfur attack Cr-Ni-Al-Si alloy steel which has a composition essentially consisting of, by weight, 0.03 to 0.3% of C, 1 to 10% of Si, not greater than 2.0% of Mn, 8 to 14% of Ni, 16 to 20% of Cr, 0.5 to 10% of Al and the balance not less than 50% of Fe.

2 Claims, 5 Drawing Sheets

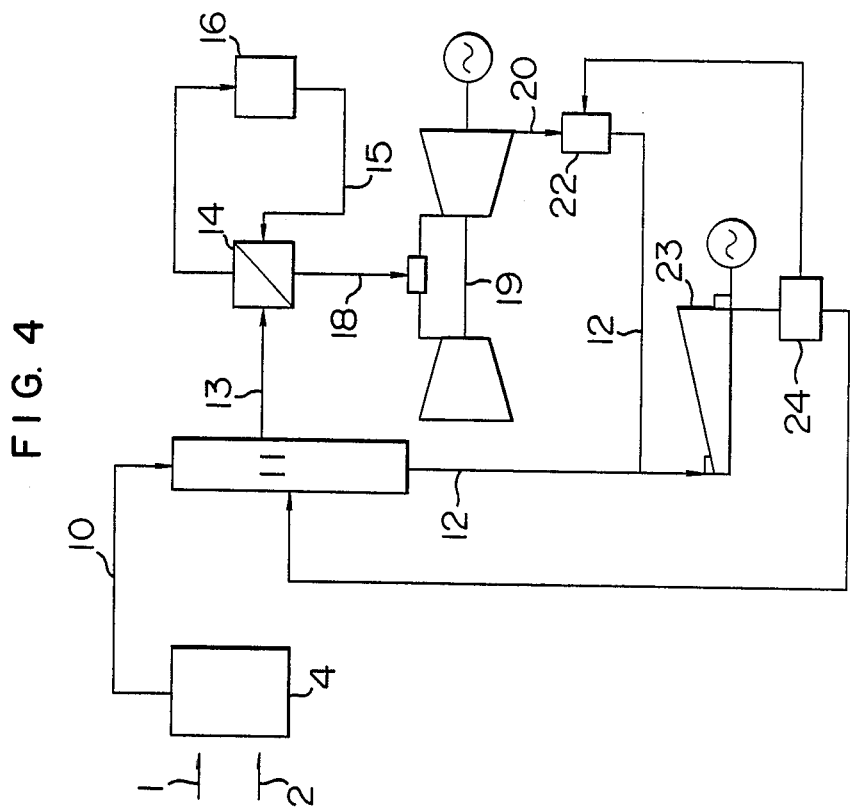

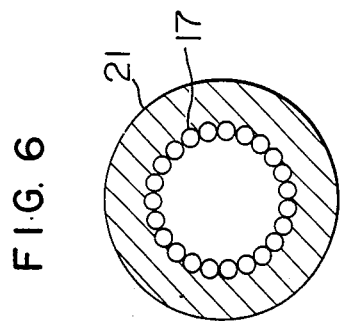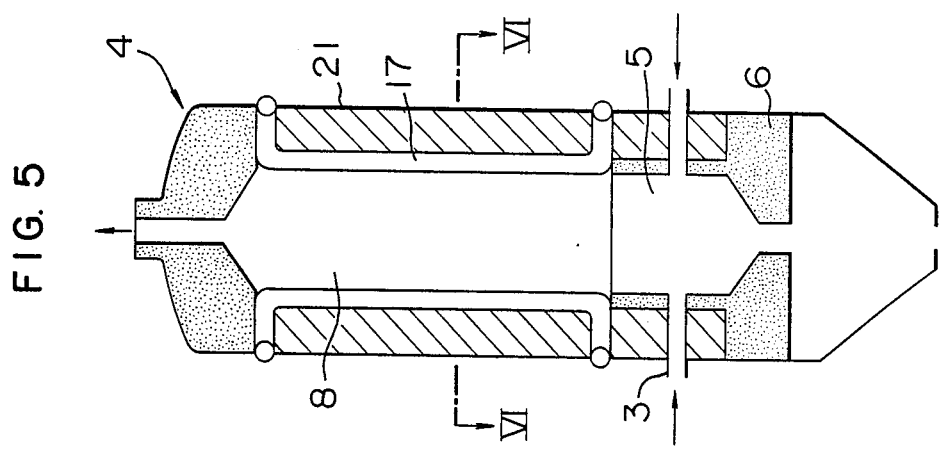

METHOD OF USING A STRUCTURAL MEMBER OF ANTI-SULFUR-ATTACK CR-NI-AL-SI ALLOY STEEL FOR COAL GASIFICATION SYSTEM

This is a continuation of application Ser. No. 795,777, filed Nov. 7, 1985, now abandoned.

BACKGROUND OF THE INVENTION

The present invention relates to a novel metallic material suitable for use as material of constituent members of coal gasification processes and other processes in which the constituent members are used in an atmosphere of hot gas containing sulfides. More particularly, the invention is concerned with a sulfidation resisting Cr-Ni-Al-Si alloy which is capable of suppressing high temperature corrosion caused by combustion gases and other product gases.

The oil crisis triggered by the Arab-Israeli war of 1973 has given rise to a demand for developing alternative fuels as substitutes for petroleum. Among these substitute fuels, coal is considered most significant as the basic fuel of the future because of an abundancy of deposits as compared with petroleum. However, since coal is a solid fuel, it is difficult to store and transport as compared with liquid fuel. This in turn has promoted development of techniques for converting coal into a fluid fuel which is easy to store and transport, and also for obtaining clean energy sources through removal of ash, SOx, etc. Typical examples of such techniques are liquefaction and gasification of coal. The gasification of coal is a process in which coal is caused to react with a gasifier such as oxygen, air or steam, thereby obtaining a product gas consisting mainly of hydrogen, carbon monoxide, methane and so forth. Three types of coal gasification processes have been proposed: namely, the fixed bed type, fluidized bed type and entrained bed type. The process type, i.e., the furnace type, and the reaction temperature are selected in accordance with the use of the product gas.

A typical example of a furnace used for the fixed bed type process is a furnace called a "Lurgi furnace." A large scale commercial plant of this type is operating in Sasol in the Union of South Africa. In this process, lumps of coal of sizes ranging between several tens of millimeters and several millimeters are fed from the top of a furnace and are gasified while the coal is held in the form of a bed which is kept stationary. The gasification is effected by the heat which is produced as a result of partial burning of coal with the aid of a gasifier which is supplied from the bottom of the furnace. This process is advantageous in that a high thermal efficiency is obtained by the counter-flow contact between the coal moving downwardly and the gasifier flowing upwardly, but suffers from various disadvantages such as generation of tar in the low temperature region due to a large temperature gradient in the furnace. In addition, this process cannot be applied to the processing of powdered coal and caking coal, and the processing rate is impractically small.

The fluidized bed type process and the entrained bed type process do not suffer from the disadvantage of the fixed bed type process, and are also capable of treating the remnant of crude oil which has to be utilized. For these reasons, intense study and development of these types of coal gasification process are being vigorously undertaken, particularly in U. S. A. and West Germany. In the fluidized bed type process, powdered coal of particle sizes falling within a predetermined range of between several millimeters and several hundreds of microns are charged into a gasification furnace. The powdered coals are fluidized and gasified by a gasifier which is also blown into the furnace. By virtue of the use of powdered coals, this process exhibits a superior heat conduction through convection, so that the reaction takes place uniformly, thus reducing the tendency for tar to be generated as a byproduct. The disadvantage of this type of coal gasification process is that the coal ued in this process has to have such a particle size that adequate fluidity of the coal is maintained.

The entrained bed type process is a process in which pulverized coal of particle sizes ranging between several tens of microns and several hundreds of microns is blown into the furnace from the bottom and is gasified at a high temperature. This process can gasify any type of coal without requiring mechanical stirring or pretreatment, and is able to gasify the coal almost completely without generation of tar. This process, however, requires pulverization of the coal, and difficulty is experienced in controlling the residence period of the coal in the furnace, as well as in connection with certain problems concerning the system such as facilities for discharge of slag and utilization of sensible heat.

The metallic materials used in coal gasification furnaces are inevitably subjected to high temperature as a result of burning of the coal, unlike the material used in coal liquefaction systems. This imposes a problem of corrosion of the metallic materials by hot gases such as $CO$, $CO_2$, $H_2$, $H_2S$ and $CH_4$ which are generated as a result of burning of the coal. In particular, $H_2S$ at high temperature causes heavy corrosion which is usually referred to as sulfur attack.

In order to put the developed process into practical use on a greater scale, it is necessary to construct a highly reliable plant through development of economical materials or working techniques which enable the constituent elements of the furnace to withstand severe conditions in the gasification process. Thus, the constituent metallic materials used in coal gasification plants are required to withstand the hot corrosive coal gases to which they will be exposed, particularly $H_2S$ which causes serious sulfur attack.

Among various austenitic steels proposed hitherto, AISI 304 (18Cr-8Ni steel), AISI 316 (18Cr-8NiMo steel), AISI 321 (18Cr-8Ni-Ti steel) and AISI 347 (18Cr-8Ni-Nb steel) are used broadly as the constituent materials for various plants by virtue of their high-temperature strength and workability, as well as low cost and the ease with which they can be manufactured. The use of these austenitic steels is spreading also to the field of piping in nuclear plants and boilers, as a result of improvements in anti-stress corrosion cracking sensitivity through reduction of C content and improvements in anti-steam corrosion properties by refining of the crystal grains. Using these materials for which the ease of production and other properties are known is advantageous from the viewpoint of design, cost and reliability.

These austenitic stainless steels, however, exhibit serious corrosion degradation due to corrosion by gases at high temperatures, particularly grain boundary attack by sulfides.

It has been proposed that the anti-corrosion properties at high temperature may be improved by increasing the Cr content. Examples of materials having increased Cr content are: AISI 309S (21Cr-13Ni steel), AISI 310S (25Cr-20Ni steel), Incoloy 800 (21Cr-32Ni-Ti, Al steel), Inconel 671 (50Cr-50Ni steel) and so forth. These materials have been proposed in view of the fact that inclusion of at least 20 to 25% of Cr is necessary for attaining high corrosion resistance of materials in long use. Attention has been given to these materials because of their ease of manufacture and good workability, but the improvement in their resistance to corrosion by sulfides such as $H_2S$ is still unsatisfactory due to the fact that the Ni content is necessarily increased in correspondence with the increase in the Cr content in order to maintain the workability and austenitic structure.

Under these circumstances, there is an increasing demand for development of an inexpensive material easy to produce and having high workability, as well as high corrosion resistance equivalent to that of AISI 309S, AISI 310S and Incoloy 800.

SUMMARY OF THE INVENTION

Accordingly, an object of the invention is to provide an alloy steel which exhibits high anti-sulfur attack property in an atmosphere of hot coal gas.

Through intense study and experiments on the materials which can be used for structures to be employed in coal gasification processes, the present inventors have found that the grain boundary corrosion caused by sulfides can be suppressed in ordinarily used austenitic steel materials such as AISI 304, AISI 316, AISI 321 and AISI 347 if a suitable amount of Si is added besides Al to these austenitic steels. Such austenitic steels containing Si and Al in combination have proved to exhibit superior corrosion resistance in a coal gas atmosphere, i.e., high resistance to grain boundary corrosion by sulfides at high temperatures, and are therefore better suited for use as the structural materials employed in coal gasification plants than known austenitic steels such as AISI 309S, AISI 310S and Incoloy 800.

According to the invention, there is provided a structural member to be subjected to a hot gas atmosphere produced through reaction between coal and a gasifier such as oxygen, air, steam or hydrogen, the structural member being made of an anti-sulfur attack Cr-Ni-Al-Si alloy steel which is prepared as follows.

Namely, the alloy steel in accordance with the invention can be obtained from one of the following four types of steels: namely, a steel containing, by weight, not greater than 2% of Mn, 8 to 11% of Ni and 18 to 20% of Cr; a steel containing not greater than 2.0% of Mn, 10 to 14% of Ni, 16 to 18% of Cr and 2 to 3% of Mo; a steel containing not greater than 2.0% of Mn, 9 to 13% of Ni, 17 to 20% of Cr and not greater than 0.6% of Ti; and a steel containing not greater than 2.0% of Mn, 9 to 13% of Ni, 17 to 20% of Cr and not greater than 1% of Nb+Ta. In one of these steels, the C content is increased to 0.03 to 0.3%, and 0.5 to 10% of Al and 1 to 10% of Si are added in combination, such that the balance is constituted by not less than 50% of Fe.

The alloy steel in accordance with the invention exhibits a remarkable gas corrosion resistance at high temperatures, when used in a coal gas atmosphere generated in a coal gasification process in which a product gas consisting mainly of hydrogen, carbon monoxide and methane is produced through reaction between coal and a gasifier such as oxygen, air, steam and so forth.

In case of the 18% Cr-8% Ni austenitic stainless steel, the gas corrosion resistance at high temperatures was significantly improved by the addition of a suitable amount of Al followed by addition of Si, even when the C content was increased to range between 0.03 and 0.3%. Steels having large Al and Si contents are rather inferior in workability. Therefore, the constituent member which requires a high workability of the material is formed by forging or rolling from an alloy steel which has comparatively small Al and Si contents, whereas the constituent member in which preference is given first to the corrosion resistance rather than workability is made by casting from an alloy steel having large Al and Si contents. It has thus been proved that various constituent members for use in coal gasification process can be obtained by suitably selecting the Al and Si contents of the alloy steel, without impairing the functions required for such members.

The reasons for limitation of content in respect of each alloy element in the alloy steel of the invention will be described hereinunder.

C: C is an important element because it serves as an austenite former and because it ensures a high strength at high temperatures. In order to permit the addition of Al and Si and to stabilize the structure as much as possible without impairing the corrosion resistance, the C content preferably ranges between 0.03 and 0.3%, more preferably between 0.07 and 0.15%.

Si: Si is a significant element for attaining the properties required for the alloy steel of the invention. For obtaining a high corrosion resistance, the Si content should be not smaller than 1%. Addition of Si in excess of 10%, however, causes saturation in the effect of improvement in corrosion resistance, and undesirably impairs the workability and the castability. The effect produced by the addition of Al varies according to the amount of addition of Si. When Si is added alone, no substantial improvement in the corrosion resistance is achieved when the Si content is not greater than 1.0%, and Si content should not be smaller than 2.0% if an appreciable effect is to be obtained. A greater effect is produced when Si is added in combination with Al than when it is added alone. The Si content preferably ranges between 3 and 5%.

Mn: Mn serves as an austenite former but the Mn content is preferably relatively small because Mn tends to impair the oxidation resistance. For this reason, the Mn content is selected to be not smaller than 2%, preferably between 1 and 2%.

Ni: Ni is one of the basic constituent elements of austenitic stainless steel. The Ni content should be not smaller than 8%, in order to maintain an austenite structure in spite of the addition of Al and Si which are ferrite formers. Addition of Ni in excess of 14% impairs the resistance to sulfur attack in a coal gas atmosphere.

Cr: This element is the most fundamental element for improving the gas corrosion resistance at high temperatures. The Cr content should be 16% or greater but is limited to be not greater than 20% in view of the Ni content.

Ti, Mo, Nb: Ti, Mo and Nb are elements which are effective in improving the high temperature strength through formation of safe carbides and nitrides. In order to obtain an appreciable effect, Ti, Mo and Nb content should be so selected as to be not greater than 0.6%, 2 to 3% and not greater than 1%, respectively. Preferably, Ti content and Nb content should range between 0.2 and 0.5%, respectively.

Al: Al is an important element which provides, in cooperation with Si, a superior anti-sulfur attack property. The Al content ranges between 0.5 and 10%, preferably between 2 and 5%. This element improves the gas corrosion resistance at high temperatures even when it is added alone to the austenite stainless steel. The effect is further increased, however, when Al is added together with Si. In order to attain an appreciable effect, the Al content should not be less than 0.5%. Addition of Al in excess of 10% causes saturation in the improving effect and, instead, causes problems in workability and castability. For this reason, the Al content is limited to be not greater than 10%. When the need for workability is not so strict, an Al content ranging between 2 and 5% provides satisfactory corrosion resistance. When the material is to be forged, the Al content can be increased up to 10%.

The alloy steel in accordance with the invention can contain other elements which are inevitably included in the course of production, besides the elements mentioned hereinabove.

In some cases, the knowledge concerning the contents of elements as specified above may prove insufficient for the practical production of an alloy steel in accordance with the invention. There is also a risk that the alloy steel of the invention will become cracked during subsequent working. In order to obtain a material having practical utility, therefore, it is necessary to suitably adjust the contents of the alloy elements in relation to each other.

More specifically, when Al is added alone, the material can be formed into sheets, bars and pipes, regardless of whether the work is done in a hot or cold state, provided that the Al content is not greater than 5%. However, an Al content exceeding 5% causes a risk of cracking during working. Addition of Si by an amount equal to the amount of Al causes a more serious effect on workability than in the case where Al is added alone. When Si is added together with Al, therefore, it is necessary to effect an adjustment of the alloy elements by increasing the C content, while suppressing the Ni and Cr contents, or to use the material in its as-cast state. Such an adjustment of the properties of alloy elements facilitates the application of the material of the invention to equipment and members which are subjected to gas atmosphere containing sulfides produced in coal gasification systems, e.g., the water-cooled wall tube of a coal gasification furnace, the constituent members of a heat exchanger, valves, nozzles and so forth.

Briefly, the material in accordance with the invention is an anti-sulfur attack Cr-Ni-Al-Si alloy which has an improved resistance to grain boundary corrosion which is caused by hot gas produced as a result of reaction between coal and a gasifier such as oxygen, air and steam, particularly resistance to grain boundary sulfur attack by sulfides in such hot gas. The composition of the material in accordance with the invention contains: 0.03 to 0.3% of C; not greater than 2% of Mn; Ni, Cr, Mo, Ti and Nb in amounts falling within the ranges of austenitic stainless steels AISI 304, AISI 316, AISI 321 and AISI 347; 0.5 to 10% of Al in combination with 1 to 10% of Si; and the balance substantially Fe and impurities inevitably included during production.

The invention will be described hereinafter with reference to the accompanying drawings.

BRIEF DESCRIPTION OF THE DRAWINGS

FIG. 4 is a block diagram of a coal-gasification power-generating composite plant having a coal gasification system which employs structural members of the invention;

FIG. 5 is a schematic vertical sectional view of an entrained bed type gasification furnace; and FIG. 6 is a sectional view taken along the line VI—VI of FIG. 5, showing the heat collecting zone in the upper part of the gasification furnace.

DESCRIPTION OF THE PREFERRED EMBODIMENTS

Figure 1:
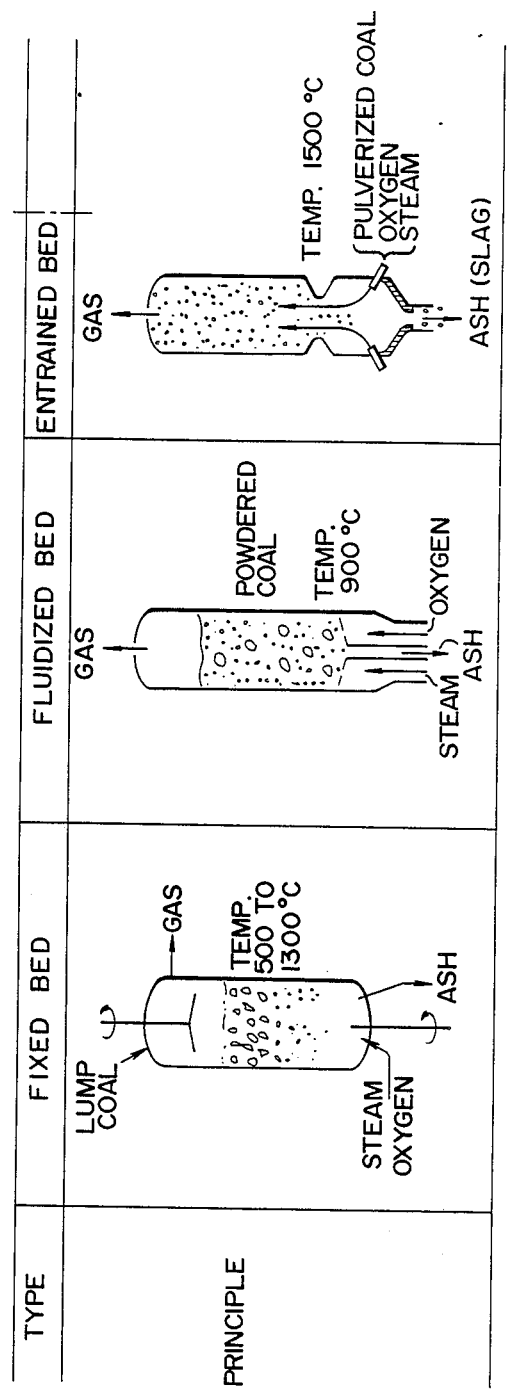
FIG. 1 is a schematic illustration of a coal gasification system.

Table 1 shows the chemical compositions of examples of alloy steels in accordance with the invention, together with comparison steels. The contents of elements in this Table are shown in terms of weight percent. In each steel, the balance is substantially Fe and inevitable impurities such as P, S, etc. The sample Nos. 1 to 18 are alloy steels in accordance with the invention, while sample Nos. 26 to 30 are comparison steels. These samples were prepared by vacuum-melting and casting the materials, followed by 1-hour water cooling at 1100° C. Test pieces of 6 mm×20 mm×25 mm were prepared from them. Sample Nos. 19 to 25 are forged materials. The test pieces of the sample Nos. 19 to 25 were prepared after being heated for 30 minutes at 1100° C. and subsequent water cooling, while the test pieces of sample Nos. 24 and 25 were formed after 30 minutes of water cooling at 1150° C. and subsequent water cooling.

TABLE 1

| No. | C | Si | Mn | Ni | Cr | Al | Mo | Ti | Nb | Cu |
|-----|---|----|----|----|----|----|----|----|----|----|
| Alloy Steel of invention | | | | | | | | | | |
| 1 | 0.08 | 2.15 | 1.75 | 8.81 | 18.75 | 0.51 | | | | |
| 2 | 0.07 | 2.31 | 1.69 | 8.77 | 18.69 | 1.09 | | | | |
| 3 | 0.07 | 2.25 | 1.81 | 8.68 | 18.81 | 2.11 | | | | |
| 4 | 0.08 | 2.18 | 1.79 | 8.15 | 18.62 | 5.09 | | | | |
| 5 | 0.09 | 2.19 | 1.72 | 8.68 | 18.65 | 9.88 | | | | |
| 6 | 0.28 | 2.15 | 1.74 | 8.29 | 18.71 | 9.53 | | | | |
| 7 | 0.08 | 1.08 | 1.71 | 8.61 | 18.75 | 2.15 | | | | |
| 8 | 0.08 | 3.15 | 1.81 | 8.72 | 18.79 | 2.21 | | | | |
| 9 | 0.07 | 5.18 | 1.74 | 8.69 | 18.68 | 2.18 | | | | |
| 10 | 0.08 | 9.88 | 1.76 | 8.80 | 18.69 | 2.23 | | | | |
| 11 | 0.29 | 5.16 | 1.75 | 9.62 | 18.18 | 5.11 | | | | |
| 12 | 0.28 | 9.11 | 1.89 | 10.59 | 18.11 | 9.51 | | | | |
| 13 | 0.07 | 2.15 | 1.79 | 12.25 | 17.93 | 2.23 | 2.05 | | | |
| 14 | 0.08 | 5.13 | 1.82 | 13.65 | 16.23 | 5.05 | 2.01 | | | |
| 15 | 0.08 | 2.21 | 1.91 | 12.61 | 17.15 | 2.18 | | 0.45 | | |
| 16 | 0.07 | 5.51 | 1.93 | 12.75 | 17.19 | 4.98 | | 0.39 | | |
| 17 | 0.07 | 2.18 | 1.82 | 12.63 | 17.18 | 2.01 | | | 0.38 | |

TABLE 1-continued

| No. | | C | Si | Mn | Ni | Cr | Al | Mo | Ti | Nb | Cu |
|---|---|---|---|---|---|---|---|---|---|---|---|
| 18 | | 0.07 | 5.01 | 1.85 | 12.75 | 17.25 | 4.99 | | | 0.39 | |
| Comparison Steel | | | | | | | | | | | |
| 19 | AISI 304 | 0.05 | 0.46 | 0.83 | 8.79 | 18.21 | | | | | |
| 20 | AISI 316 | 0.06 | 0.63 | 0.83 | 11.79 | 17.52 | | 2.23 | | | |
| 21 | AISI 321 | 0.03 | 0.87 | 0.92 | 9.13 | 17.43 | | | 0.29 | | |
| 22 | AISI 347 | 0.03 | 0.63 | 1.02 | 9.43 | 17.76 | | | | 0.43 | |
| 23 | AISI 631 | 0.08 | 0.78 | 0.69 | 7.35 | 17.81 | 1.08 | | | | |
| 24 | AISI 310S | 0.05 | 0.75 | 0.99 | 19.38 | 25.28 | | | | | |
| 25 | Incoloy 800 | 0.08 | 0.37 | 0.90 | 33.69 | 19.94 | 0.41 | | 0.43 | | 0.48 |
| 26 | | 0.07 | 0.73 | 1.75 | 8.15 | 18.81 | 0.49 | | | | |
| 27 | | 0.06 | 0.71 | 1.72 | 8.23 | 18.92 | 2.12 | | | | |
| 28 | | 0.06 | 0.75 | 1.85 | 8.92 | 18.63 | 4.48 | | | | |
| 29 | | 0.07 | 0.68 | 1.79 | 9.01 | 18.78 | 6.25 | | | | |
| 30 | | 0.06 | 0.59 | 1.76 | 8.85 | 18.77 | 9.49 | | | | |

These test pieces were subjected to a corrosion test in which they were held for 100 hours within an atmosphere simulating a coal gas, containing 24% of $H_2$, 18% of CO, 12% of $CO_2$, 6% of $CH_4$, 0.5% of $H_2S$ and the balance $H_2O$. The test temperature was 850° C., while the pressure was 30 atm. The corrosion loss is expressed in terms of the sum of reduction in thickness and depth of corrosion (grain boundary corrosion). The results of the test are shown in Table 2.

TABLE 2

| No. | Thickness reduction | Internal corrosion | Corrosion loss |
|---|---|---|---|
| Alloy steel of invention | | | |
| 1 | 0.306 | 0.089 | 0.395 |
| 2 | 0.214 | 0.075 | 0.289 |
| 3 | 0.050 | 0.051 | 0.101 |
| 4 | 0.025 | 0.025 | 0.050 |
| 5 | 0.024 | 0.027 | 0.051 |
| 6 | 0.024 | 0.025 | 0.049 |
| 7 | 0.090 | 0.062 | 0.152 |
| 8 | 0.055 | 0.051 | 0.106 |
| 9 | 0.055 | 0.032 | 0.087 |
| 10 | 0.054 | 0.026 | 0.080 |
| 11 | 0.054 | 0.027 | 0.081 |
| 12 | 0.046 | 0.027 | 0.073 |
| 13 | 0.084 | 0.052 | 0.136 |
| 14 | 0.044 | 0.028 | 0.072 |
| 15 | 0.087 | 0.048 | 0.135 |
| 16 | 0.046 | 0.025 | 0.071 |
| 17 | 0.086 | 0.058 | 0.142 |
| 18 | 0.047 | 0.028 | 0.075 |
| Comparison Steel | | | |
| 19 AISI 304 | 0.371 | 0.150 | 0.521 |
| 20 AISI 316 | 0.382 | 0.182 | 0.564 |
| 21 AISI 321 | 0.342 | 0.215 | 0.557 |
| 22 AISI 347 | 0.543 | 0.148 | 0.691 |
| 23 AISI 631 | 0.293 | 0.075 | 0.368 |
| 24 AISI 310S | 0.195 | 0.152 | 0.347 |
| 25 Incoloy 800 | 0.324 | 0.149 | 0.463 |
| 26 | 0.313 | 0.102 | 0.415 |
| 27 | 0.046 | 0.088 | 0.134 |
| 28 | 0.029 | 0.052 | 0.081 |
| 29 | 0.028 | 0.051 | 0.079 |
| 30 | 0.024 | 0.054 | 0.078 |

As will be understood from Table 2, the alloy steel of the invention exhibits a remarkably improved resistance to corrosion by gas at high temperature as compared with comparison steel Nos. 19 (AISI 304), 20 (AISI 316), 21 (AISI 321) and 22 (AISI 347). In particular, the alloy steel sample Nos. 7 to 10 of the invention, to which Si is added together with 2% of Al, exhibit superior corrosion resistance even over the comparison steel sample Nos. 24 (AISI 310 S) and 25 (Incoloy 800) which have large Cr contents and, hence, exhibit high corrosion resistance. It will be understood also that, when the Al content is the same, higher corrosion resistance can be obtained by addition of not less than 1.5% of Si, as in the case of alloy steel sample Nos. 1 to 5 and 12 in comparison with comparison steel No. 23 (AISI 631) and comparison steel Nos. 26 to 30.

Figure 2:
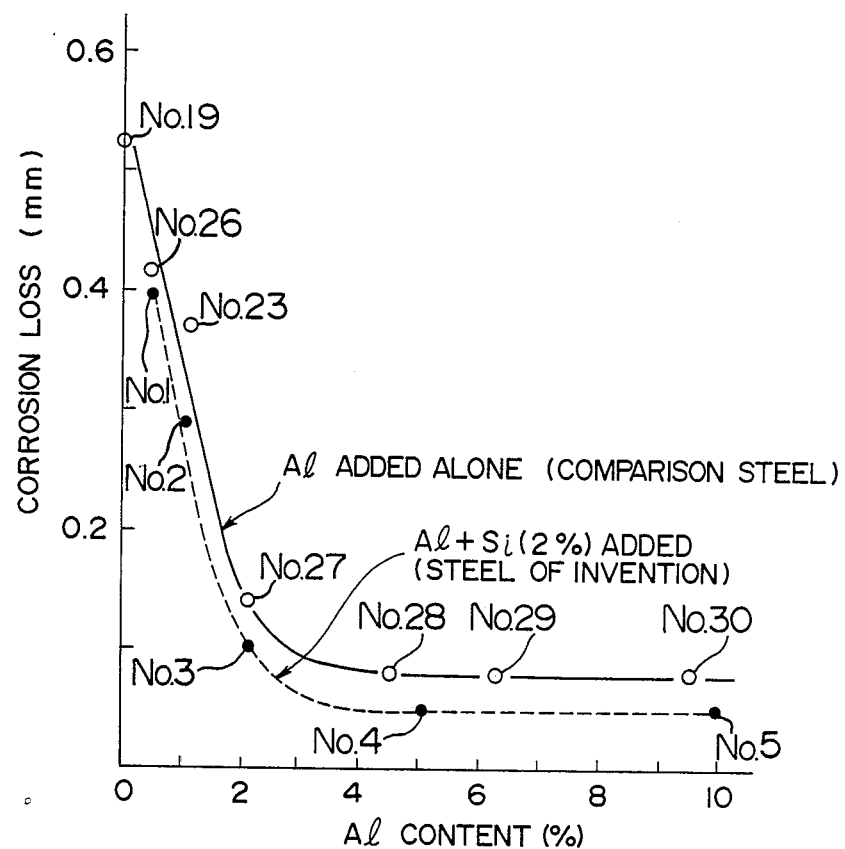
FIG. 2 is a graph showing the relationship between Al content of the alloy steel and the corrosion loss.

FIG. 2 shows the relationship between the Al content and the corrosion loss in the alloy steel of the invention to which 2% of Si is added together with Al, in comparison with that of the comparison steels to which Al is added alone. It will be seen that the corrosion resistance is improved by the combined addition of Al and Si as compared with the case where Al is added alone.

Figure 3:
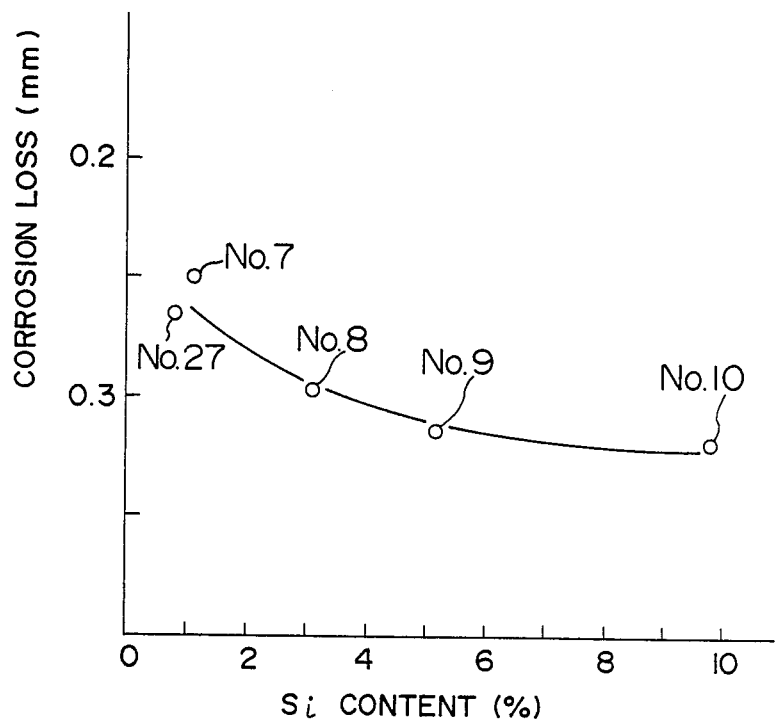
FIG. 3 is a graph showing the relationship between Si content of the steel and the corrosion loss.

FIG. 3 shows a relationship between the Si content and the corrosion loss, in alloy steels to which Si has been added in various amounts in addition to 2% Al. It will be understood from this Figure that the resistance to corrosion by hot gas is increased by increase in the Si content, as compared with the case where Al is added alone, and also that the Si content should be not smaller than 1.5% in order to obtain an appreciable effect.

As explained before, the alloy steel in accordance with the invention is effectively used as materials of devices and members which are subjected to an atmosphere containing sulfides produced in a coal gasification system, e.g., a water-cooled tube wall of a gasification furnace, members of a heat exchanger, valves, nozzles and so forth. A coal-gasification combined cycle power plant, which employs such a coal gasification system, will be explained hereinafter by way of example.

FIG. 4 is a block diagram of a coal-gasification combined cycle power plant which has various parts made from the material in accordance with the invention. FIG. 5 is a schematic vertical sectional view of an entrained bed type coal gasification furnace, while FIG. 6 is a sectional view taken along the line VI—VI of FIG. 5, showing an upper water-cooled structure of the gasification furnace.

As shown in these Figures, coal 1 is introduced by means of a burner 3 into a gasification furnace 4 to which also introduced is oxygen as a gasifier 2. The coal 1 thus introduced is gasified in a gasification zone 5. The gasification zone 5 is defined by a refractory structure 6 because a high temperature exceeding 1600° C. is established in the gasification zone. The coal gas of high temperature is delivered to a heat collecting zone 8 which is constituted by a water-cooled structure 17 made from an alloy steel of the invention and is cooled down below 900° C. before it reaches the outlet of the gasification furnace 4. The gas as a crude gas 10 coming from the outlet of the gasification furnace 4 is sent to a steam generator 11 which is made of an alloy steel in accordance with the invention, so that the crude gas 10 is cooled through a heat exchange in the steam generator 11. Thus, the sensible heat posessed by the crude gas 10 is collected as the energy of steam 12. The crude gas 13 coming out of the steam generator 11 is sent to a gas-gas heat exchanger 14 which is made of an alloy steel in accordance with the invention, where heat is exchanged between the crude gas 13 and the refined gas 15, so that the crude gas is cooled down to the temperature suitable for the refining before it is sent to a gas refining section 16. The gas 15 refined in the gas refining section 16 makes a heat exchange with the crude gas in the gas-gas heat exchanger 14 such as to be heated by the crude gas, and is supplied as a fuel gas 18 to a gas turbine combustor 19. The hot combustion gas expands through a gas turbine to drive a generator, thereby generating electric energy.

This composite plant has a heat recovery system which will be explained hereinafter. The exhaust gas 20 exhausted from the gas turbine is introduced into a heat recovery boiler 22 such as to produce a sensible heat of steam. On the other hand, the crude gas 10 available at the outlet of the gasification furnace 4 delivers sensible heat to water in the steam generator 11. The steam generated in the heat recovery boiler 22 and the steam generated in the steam generator 11 merge in each other and the thus mixed steam is superheated in a superheater such as to become superheated steam which is sent to a steam turbine 23. The superheated steam expands through the steam turbine 23 which in turn drives a generator thereby generating electric energy. The steam discharged from the steam turbine 23 is condensed in a condenser 24 to become condensate which in turn is fed as feedwater to the heat recovery boiler by a feedwater pump.

What is claimed is:

1. A method of using an alloy steel in a coal gasification furnace comprising subjecting a water-cooled tube wall to a hot gas atmosphere comprising $H_2$, CO, $CH_4$ and $H_2S$ produced through reaction between coal and a gasifier, wherein said water-cooled tube wall is made of an anti-sulfur attack Cr-Ni-Al-Si alloy steel having a composition consisting essentially of, by weight, 0.03-0.3% of C, 1-10% of Si, not greater than 2.0% of Mn, 10-14% of Ni, 16-18% of Cr, 0.5-10% of Al, 2-3% of Mo, and the balance not less than 50% of Fe.

2. A coal gasification furnace comprising:
   a gasification zone for combusting a fine powdered coal with an oxidizing gas to form a combustion gas comprising $H_2$, CO, $CH_4$ and $H_2S$; and
   a heat collection zone covered on its inner wall with water-cooled tubes, wherein said water-cooled tubes are exposed to said combustion gas and wherein each of said water-cooled tubes is made of an anti-sulfur attack Cr-Ni-Al-Si alloy steel having a composition consisting essentially of, by weight, 0.03 to 0.3% of C, 1-10% of Si, not greater than 2.0% of Mn, 10-14% of Ni, 16-18% of Cr, 0.5-10% of Al, 2-3% of Mo, and the balance not less than 50% of Fe.

* * * * *